United States Patent
Umana et al.

(10) Patent No.: US 7,569,281 B2
(45) Date of Patent: Aug. 4, 2009

(54) FLEXIBLE PACKAGING LAMINATE FILMS INCLUDING A BLOCK COPOLYMER LAYER

(75) Inventors: Mario G. Umana, League City, TX (US); Huan Yang, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 476 days.

(21) Appl. No.: 11/408,327

(22) Filed: Apr. 21, 2006

(65) Prior Publication Data

US 2007/0020473 A1 Jan. 25, 2007

Related U.S. Application Data

(60) Provisional application No. 60/702,514, filed on Jul. 25, 2005.

(51) Int. Cl.
*B32B 27/08* (2006.01)
*B32B 27/32* (2006.01)

(52) U.S. Cl. ........................ 428/517; 428/516; 428/521; 428/523

(58) Field of Classification Search ........................ None
See application file for complete search history.

(56) References Cited

U.S. PATENT DOCUMENTS

| | | | |
|---|---|---|---|
| 3,239,478 A | 3/1966 | Harlan, Jr. | |
| 3,244,664 A | 4/1966 | Zelinski et al. | |
| 3,281,383 A | 10/1966 | Zelinski et al. | |
| RE27,145 E | 6/1971 | Jones | |
| 3,594,452 A | 7/1971 | De La Mare et al. | |
| 3,692,874 A | 9/1972 | Farrar et al. | |
| 3,766,301 A | 10/1973 | De La Mare et al. | |
| 3,880,954 A | 4/1975 | Kahle et al. | |
| 3,985,830 A | 10/1976 | Fetters et al. | |
| 4,039,593 A | 8/1977 | Kamienski et al. | |
| 4,076,915 A | 2/1978 | Trepka | |
| 4,104,332 A | 8/1978 | Zelinski | |
| 4,122,134 A | 10/1978 | Miki et al. | |
| 4,167,545 A | 9/1979 | Fahrbach et al. | |
| 4,185,042 A | 1/1980 | Verkouw | |
| 4,210,686 A * | 7/1980 | Gajewski et al. | ............ 428/35.2 |
| 4,379,891 A | 4/1983 | Haynes | |
| 4,892,903 A | 1/1990 | Himes | |
| 4,970,259 A | 11/1990 | Mitchell et al. | |
| 4,977,014 A | 12/1990 | Mitchell et al. | |
| 5,068,138 A | 11/1991 | Mitchell et al. | |
| 5,075,377 A | 12/1991 | Kawabuchi et al. | |
| 5,272,214 A | 12/1993 | Custro et al. | |
| 5,320,899 A | 6/1994 | Djiauw | |
| 5,681,895 A | 10/1997 | Bening et al. | |
| 5,777,043 A | 7/1998 | Shafer et al. | |
| 5,849,843 A | 12/1998 | Laurin et al. | |
| 6,027,776 A | 2/2000 | Mueller | |
| 6,060,136 A | 5/2000 | Patrick et al. | |
| 6,479,138 B1 | 11/2002 | Childress | |
| 6,517,936 B1 | 2/2003 | Ciocca et al. | |
| 6,517,950 B1 | 2/2003 | Patrick et al. | |
| 6,716,499 B1 | 4/2004 | Vadhar | |
| 6,723,399 B2 * | 4/2004 | Chundury et al. | ........... 428/35.2 |
| 6,783,842 B2 | 8/2004 | Niepelt | |
| 6,983,575 B2 | 1/2006 | Longo | |
| 6,984,442 B2 | 1/2006 | Brebion et al. | |
| 7,247,674 B2 * | 7/2007 | Kitano et al. | .................. 525/93 |
| 2005/0197464 A1 | 9/2005 | Handlin, Jr. et al. | |
| 2005/0197465 A1 | 9/2005 | Handlin, Jr. | |

FOREIGN PATENT DOCUMENTS

| | | |
|---|---|---|
| EP | 0 658 421 A1 | 12/1994 |
| WO | 00/77118 A1 | 12/2000 |
| WO | 01/15897 A1 | 3/2001 |
| WO | 02/28965 A1 | 4/2002 |

OTHER PUBLICATIONS

V. Ronesi, "Adhesion of Ethylene-Styrene Copolymers to Polyethylene in Microlayers", Journal of Applied Polymer Science, vol. 89, 153-162 (2003).

* cited by examiner

*Primary Examiner*—Monique R Jackson
(74) *Attorney, Agent, or Firm*—Michael A. Masse; Gregory N. Clements

(57) ABSTRACT

What is claimed is a flexible packaging film having improved toughness without compromise of other physical properties. The flexible packaging film is a laminate of at least two film layers of a polyolefin and at least one film layer of a block copolymer. The block copolymer employed in the present invention is a selectively hydrogenated high vinyl block copolymer.

25 Claims, No Drawings

FLEXIBLE PACKAGING LAMINATE FILMS INCLUDING A BLOCK COPOLYMER LAYER

This application claims the benefit of U.S. Provisional Patent Application No. 60/702,514, filed Jul. 25, 2005.

FIELD OF THE INVENTION

The present invention is directed to flexible packaging laminate films having improved interlayer adhesion between the laminations that include at least one high vinyl block copolymer layer that ties at least two polyolefin layers. More specifically, the present invention is directed to a multilayered flexible packaging laminate film in which the block copolymer layer comprises a selectively hydrogenated high vinyl block copolymer. The present invention is also directed to hygienic and non-hygienic articles that include the flexible packaging laminate films of the present invention.

BACKGROUND OF THE PRIOR ART

Flexible packaging film is produced in great volume to meet extensive demand in a variety of industrial applications in which such films are utilized. The hallmarks of good flexible multilayer packaging films are superior interlayer adhesion, toughness, optical, and safety properties and low cost at the lowest possible gauge. To date, no single class of packaging film is optimum in all of these categories. For example, although flexible polyvinyl chloride (PVC) can be fabricated into a tough, clear and low cost packaging film product, the safety aspect of flexible PVC film, especially in the packaging of edible material, is suspect. There is thus a long felt need in the art for a packaging film, free of vinyl chloride, which provides the advantages associated with flexible PVC film.

Polyolefinic film is environmentally safe. In addition, various polyolefinic films are quite clear and relatively inexpensive. However, the problem associated with the use of polyolefin films, which are highly attractive from the point of view of environmental safety, is their low degree of toughness compared to flexible PVC film. For example, one of the strongest of the polyolefinic films is polypropylene (PP) film. Still, the toughness characteristics of PP film, as measured by dart impact or puncture resistance, are significantly below the corresponding values of less environmentally safe flexible PVC film.

It is well known in the art to laminate layers in order to increase toughness of thin films. However, this expedient cannot overcome the inherent low strength characteristics of polyolefins. This is due to one or more of the following deficiencies of multilayer polyolefin films: failure due to delamination, excessive thickness and loss of optical properties. For example, when laminated films are utilized to make packages that are heat sealed, one of the problems often encountered is that when an attempt is made to pull this package open, the film begins to delaminate (peel off in layers rather than allowing separation as if the film is one layer at the point of heat sealing). These defects emphasize that laminate films of polyolefin are unsuitable replacements for flexible PVC high strength films.

There is a strong need in the art for a new class of compatible polymers that can be bonded to polyolefin films to increase the toughness of the films without adversely affecting the desirable properties of polyolefin packaging films and allowing the design of a structure that meets, among others, desired permeation requirements.

SUMMARY OF THE INVENTION

The present invention provides a flexible packaging laminate film that imparts improved interlayer adhesion and toughness to a polyolefin film without adversely affecting those polyolefin characteristics which prompt its utilization as a flexible packaging film. That is, a flexible packaging laminate film is provided which embodies the desirable physical properties of polyolefin films, including environmental safety, optical and thickness, but significantly increases the toughness characteristics of the polyolefin-bonded flexible packaging laminate film by utilizing a block copolymer layer as the tie layer for two or more polyolefin layers.

In broad terms, the present invention provides a flexible packaging laminate film having improved interlayer adhesion and toughness that comprises at least two polyolefin layers tied together with at least one block copolymer layer, wherein the block copolymer layer comprises a selectively hydrogenated high vinyl block copolymer. The block copolymers employed in the present invention will be described in greater detail herein below.

In the present invention, a flexible packaging film is provided which is a laminate of at least two layers of a polyolefin homopolymer or copolymer tied together by at least one layer of a selectively hydrogenated high vinyl block copolymer. The laminate may have any number of layers. Preferably, the laminate is a three, five, seven or nine-layered ply including the block copolymer sandwiched between polyolefin layers, more preferably a three-layered ply including the block copolymer sandwiched between two polyolefin layers.

The present invention also embraces hygienic and non-hygienic articles that include or are made from the flexible packaging laminate films of the present invention. The articles can be used, for example, in food, medical, industrial or houseware applications.

DETAILED DESCRIPTION OF THE INVENTION

As stated above, the present invention provides a flexible packaging laminate film that includes at least two polyolefin layers and at least one selectively hydrogenated high vinyl block copolymer layer. The flexible packaging film of the present invention exhibits desirable properties of polyolefin films, such as environmental safety, optical, thickness, affinity to polyolefins and thermal (sealing) while exhibiting a significant improvement in interlayer adhesion and toughness which has not been observed from prior art polyolefin films that do not include the block copolymer layer. As used within the entire text of this specification, the terms "optical", "optical properties" and "optical qualities" refer to clarity as measured by haze and light transmittance using standard tests which are known in the art. In addition, as used herein, the terms "interlayer adhesion" or "interlayer adhesion properties" refer to the ability of the layers in the laminate of the present invention to adhere to one another when subjected to stress-to the ability of the block copolymer layers of the present invention to adhere to the polyolefin layers of the present invention such that the layers do not peel apart (delaminate) when subjected to various types of stress. In other words, the terms "interlayer adhesion" or "interlayer adhesion properties" refer to the ability of the block copolymer layers of the present invention to "tie" together the polyolefin layers of the laminate without influencing impact and strength properties. Furthermore, as used herein, the term "tie layer" refers to the layer of polymer of the present invention that functions to adhere the polyolefin layers together.

Flexible packaging films within the contemplation of the present invention include those that employ environmentally safe polymers of the prior art, the principal class of which is polyolefins. The polyolefins within the scope of the present invention are those known to be useful in the manufacture of films, as well as those less frequently employed in the manufacture of flexible packaging films, and include both linear and branched polyolefins. Among the non-limiting class of polyolefins which are included within the present invention to produce flexible packaging films include ethylene-, propylene- and butylene-based olefins. Exemplary polymers include, for example, ethylene homopolymers, ethylene/alpha-olefin copolymers, propylene homopolymers and copolymers, propylene/alpha-olefin copolymers, high impact polypropylene, butylene homopolymers, butylene/alpha olefin copolymers and other alpha olefin copolymer or interpolymers. Representative polyolefins include, for example, but are not limited to, substantially linear ethylene polymers, homogeneously branched linear ethylene polymers, heterogeneously branched linear ethylene polymers, including, but not limited to, linear low density polyethylenes (LLDPE), ultra or very low density polyethylenes (ULDPE or VLDPE), medium density polyethylenes (MDPE), high density polyethylenes (HDPE) and high pressure low density polyethylenes (LDPE). Other polymers included hereunder are ethylene/acrylic acid (EAA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, propylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Preferred are high clarity, soft olefin polymers such as polyethylene and polypropylene copolymers, plastomers, elastomers and interpolymers. In addition, the polyolefins of the present invention may be polyolefins made using any of the metallacene catalyst technology available. Examples of commercially available polyolefins which may be used in the present invention include, but are not limited to, Marflex® 5355, a low density polyethylene polymer commercially available from Chevron Phillips; Marflex® 7109M, a linear, low density polyethylene polymer commercially available from Chevron Phillips; LDPE 1010®, a low density polyethylene polymer commercially available from Huntsman Polymers; PE 5050®, a low density polyethylene polymer commercially available from Huntsman Polymers; LLDPE 8101®, a linear, low density polyethylene polymer commercially available from Huntsman Polymers; PP 23M2A®, a polypropylene polymer commercially available from Huntsman Polymers; 12N25A®, a polypropylene polymer commercially available from Huntsman Polymers; and 12G25A®, a polypropylene polymer commercially available from Huntsman Polymers. While the multilayer films of the present invention are contemplated to comprise polyolefin layers that could comprise any of the above polyolefins, the preferred polyolefins are polypropylene and polyethylene. Also contemplated within the scope of the present invention are multilayer films in which the polyolefin layers are formed from different polyolefins (e.g., a three layer multilayer film that comprises a first layer of one polyolefin and a second layer of a different polyolefin with a layer of styrenic block copolymer sandwiched between said first and second polyolefin layers; more specifically as an example, a first layer of polypropylene and a second layer of polyethylene with a layer of styrenic block copolymer sandwiched between said first and second polyolefin layers).

In addition to the polyolefins, the flexible packaging films of the present invention also include at least one block copolymer. The block copolymers used in the laminate of the present invention are well known for their toughness and include what has traditionally been referred to one or more rubber blocks and one or more glassy blocks. However, block copolymers of the type described herein have not often been used in the production of flexible packaging films due to the problems often associated with films made from such block copolymers. Although the invention is independent of any theory explaining its operation, the reason why many block copolymers have not commonly been employed in flexible packaging films is believed to be their incompatibility with polymers, such as polyolefins, that are usually employed in this application. The present invention is predicated upon the identification of a specific class of block copolymers that has been found to be highly compatible with polyolefins utilized in flexible packaging films. Indeed, the block copolymers of the present invention are particularly suitable for bonding to polyolefin layers in a multilayer structure of the type employed in the manufacture of flexible packaging film and for imparting their toughness to such films. Thus, the present invention contemplates laminated films having any number of layers.

These flexible packaging films of the present invention include at least two polyolefin layers and at least one block copolymer layer wherein the block copolymer layer comprise one or more selectively hydrogenated high vinyl block copolymers.

In accordance with the present invention, the selectively hydrogenated high vinyl block copolymers that can be used in the present invention contain at least one conjugated diene block and at least one monoalkenyl arene hydrocarbon block. These selectively hydrogenated block copolymers have a vinyl content greater than about 60% prior to hydrogenation, a monoalkenyl arene hydrocarbon content from about 8 to about 40% and a melt flow index from about 1 to about 40 grams/10 minutes according to ASTM 1238 at 230° C. and 2.16 kg. The selectively hydrogenated block copolymer may be a neat polymer or it may be compounded using techniques well known to those skilled in the art.

More specifically, the selectively hydrogenated high vinyl block copolymers that can be used as the block copolymer in the present invention have at least one $A_1$ block and at least one $B_1$ block and are of the general formula:

$$A_1\text{-}B_1\text{-}A_1, (A_1\text{-}B_1)_n, (A_1\text{-}B_1)_nA_1, \text{ or } (A_1\text{-}B_1)_nX$$

or mixtures thereof, wherein prior to hydrogenation each $A_1$ block independently is predominantly a polymerized monoalkenyl arene hydrocarbon block having an average molecular weight of from about 4,000 to about 45,000; prior to hydrogenation each $B_1$ block independently is predominantly a polymerized conjugated diene hydrocarbon block selected from the group consisting of polybutadiene, polyisoprene, polypentadiene, polyhexadiene and mixtures thereof, having an average molecular weight of from about 25,000 to about 200,000 for the sequential block copolymer and from about 12,500 to about 100,000 for the coupled block copolymer; n has a value of about 2 to about 30, preferably about 2 to about 15, more preferably about 2 to about 6, and X is a coupling agent residue; the monoalkenyl arene content of the block copolymer is from about 8 to about 40 weight percent based on the total weight of the block copolymer; the vinyl content of the conjugated diene hydrocarbon block prior to hydrogenation is from about 60 to about 85 mol percent; subsequent to hydrogenation less than about 50 percent of the monoalkenyl arene double bonds have been hydrogenated and at least about 80 percent of the conjugated diene double bonds have been hydrogenated; and the melt index of the block copolymer ranges from about 1 to about 40 grams/10 minutes according to ASTM D1238 at 230° C. and 2.16 kg weight.

As used herein, the term "molecular weights" refers to the molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The selectively hydrogenated high vinyl block copolymers utilized in the present invention can be prepared by anionic polymerization of the monoalkenyl arene hydrocarbon and the diene selected from the group consisting of butadiene, isoprene, pentidiene, hexadiene and mixtures thereof. Methods for anionic polymerization are well known and can be found in such references as U.S. Pat. No. 4,039,593 and U.S. Reissue Pat. No. Re 27,145.

The selectively hydrogenated high vinyl block copolymers can be linear, linear coupled or radial block copolymers having a mixture of from 2 to 6 "arms". Linear block copolymers can be made by polymerizing the monoalkenyl arene to form a first $A_1$ block, adding the diene to form a $B_1$ block, and then adding additional monoalkenyl aromatic to form a second $A_1$ block. A linear coupled block copolymer is made by forming the first $A_1$ block, adding the diene to form a $B_1$ block and then contacting the diblock formed from the $A_1$ and $B_1$ blocks with a difunctional coupling agent. A radial block copolymer is prepared by using a coupling agent that is at least trifunctional. In addition, mixtures of the block copolymers of the above formulas may be employed.

The difunctional coupling agents that are used in preparing the linear block copolymers that can be used include, for example, methyl benzoate as disclosed in U.S. Pat. No. 3,766, 301. Other coupling agents having multiple (i.e., two, three or four) functional groups useful for forming radial block copolymers include, for example, silicon tetrachloride and alkoxy silanes as disclosed in U.S. Pat. No. 3, 244,664, 3,692, 874, 4,076,915, 5,075,377, 5,272,214 and 5,681,895; polyepoxides, polyisocyanates, polyimines, polyaldehydes, polyketones, polyanhydrides, polyesters, polyhalides as disclosed in U.S. Pat. No. 3,281,383; diesters as disclosed in U.S. Pat. No. 3,594,452; methoxy silanes as disclosed in U.S. Pat. No. 3,880,954; divinyl benzene as disclosed in U.S. Pat. No. 3,985,830; 1,3,5-benzenetricarboxylic acid trichloride as disclosed in U.S. Pat. No. 4,104,332; glycidoxytrimethoxy silanes as disclosed in U.S. Pat. No. 4,185,042; and oxydipropylbis(trimethoxy silane) as disclosed in U.S. Pat. No. 4,379, 891.

When the block copolymers of the present invention are made by coupling, those of ordinary skill in the art will recognize that depending upon the particular coupling agent utilized, there may be amounts of diblock present in the final product. In the present invention, preferably the coupling efficiency will be greater than about 60% (less than about 40% diblock in the final polymer product). More preferably, the coupling efficiency will be greater than 80%, even more preferably greater than 90%.

An important aspect of the selectively hydrogenated high vinyl block copolymer utilized to prepare the films of the present invention is the microstructure of the polymer. The microstructure relevant to the present invention is a high amount of vinyl in the $B_1$ blocks. In the films of the present invention, the selectively hydrogenated block copolymers utilized have a vinyl content greater than about 60 mol percent in the $B_1$ blocks prior to hydrogenation. Preferably the vinyl content will be from about 60 to about 85 mol percent, more preferably from about 65 to about 85 mol percent, and even more preferably, from about 70 to about 85 mol percent.

In the films of the present invention, the selectively hydrogenated high vinyl block copolymers have a hydrogenation degree greater than about 80 percent, preferably greater than about 90 percent. This means that more than from about 80 percent of the. conjugated diene double bonds in the $B_1$ block have been hydrogenated from an alkene to an alkane. In one embodiment, the $B_1$ block has a hydrogenation degree greater than about 95 percent.

The monoalkenyl arene hydrocarbon content of the selectively hydrogenated high vinyl block copolymer is from about 8 to about 40 weight percent, based on the total weight of the block copolymer. In one embodiment, the content is from about 10 percent to about 25 percent. In still another embodiment, the content is from about 10 percent to about 20 percent. Any selectively hydrogenated high vinyl block copolymer having a monoalkenyl arene hydrocarbon content within these ranges can be used with the present invention. Subsequent to hydrogenation, up to about 50% of the alkenyl arene hydrocarbon double bonds in the $A_1$ blocks have been hydrogenated. In another embodiment from 0 to about 30 percent of the alkenyl arene hydrocarbon double bonds in the $A_1$ blocks have been hydrogenated. In still another embodiment, 0 to about 10 percent of the alkenyl arene hydrocarbon double bonds in the $A_1$ blocks have been hydrogenated.

The monoalkenyl arene hydrocarbons of the $A_1$ blocks include styrene, o-methylstyrene, p-methylstyrene, p-tert-butylstyrene, 1,3-dimethylstyrene, alpha-methylstrene, vinylnaphthalene, vinylanthracene and the like. The preferred monoalkenyl arene hydrocarbon is styrene. The molecular weight of each of the $A_1$ blocks in the selectively hydrogenated high vinyl block copolymers used is from about 4,000 to about 45,000. Preferably, the molecular weight is from about 4,000 to about 30,000, more preferably from about 5,000 to about 15,000. In even still another embodiment of the present invention, the molecular weight of the $A_1$ block is from about 5,000 to about 8,000. Each of the $A_1$ blocks of the selectively hydrogenated high vinyl block copolymers can be a monoalkenyl arene hydrocarbon block having any molecular weight within these ranges.

The conjugated diene blocks utilized to prepare the $B_1$ blocks of the selectively hydrogenated high vinyl block copolymers are those having from 4 to 8 carbon atoms and include, but are not limited to, 1,3-butadiene, 2-methyl-1,3-butadiene(isoprene), 2,3-dimethyl-1,3-butadiene, 1,3-pentadiene, 1,3-hexadiene, amyl butadiene and the like. Mixtures of such conjugated dienes may also be used. The preferred conjugated dienes are polybutadiene, polyisoprene, and mixtures thereof. The molecular weights of each of the $B_1$ blocks range from about 20,000 to about 300,000 when the block is a sequential block copolymer, preferably from about 30,000 to about 200,000, more preferably from about 35,000 to about 175,000. When the $B_1$ block relate to a coupled block copolymers, the range can be roughly half that of the sequential block copolymer, from about 10,000 to about 150,000, preferably from about 15,000 to about 100,000, more preferably from about 17,500 to about 87,500.

For the purposes of the selectively hydrogenated high vinyl block copolymer utilized in the films of the present invention, the term "melt index" is a measure of the melt flow of the polymer according ASTM D1238 at 230° C. and 2.16 kg weight. It is expressed in units of grams of polymer passing through a melt rheometer orifice in 10 minutes. The selectively hydrogenated block copolymers utilized in the films of the present invention have a melt index allowing for easier processing than similar hydrogenated block copolymers that have higher melt indexes. In one embodiment, the hydrogenated block copolymers of the present invention have a melt index from about 1 to about 40 grams/10 minutes. While the preferred range is from about 1 to about 40, those of ordinary skill in the art will recognize the in particular instances, the melt index with regard to the films will be from about 1 grams/10 minutes to about 30 grams/10 minutes, preferably from about 3 grams/10 minutes to about 25 grams/10 minutes. In one preferred embodiment of the present invention, the melt flow index will range from about 3 grams/10 minutes to about 10 grams/10 minutes. In another preferred embodiment, the melt index will range from about 15 grams/10 minutes to about 25 grams/10 minutes.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

Examples of the selectively hydrogenated high vinyl block copolymers utilized in the present invention and the methods for preparing the same may be found in the literature, such as in U.S. Patent Publication No. 2005/0197465, published Sep. 8, 2005 (U.S. patent application Ser. No. 11/069,487, filed Mar. 1, 2005, entitled "BLOCK COPOLYMERS HAVING HIGH FLOW AND HIGH ELASTICITY" claiming priority to U.S. Provisional Patent Application No. 60/549,570, filed Mar. 3, 2004), the entire contents incorporated herein by reference.

Also contemplated within the scope of the present invention are flexible packaging laminate films that comprise at least two polyolefin layers and at least one block copolymer layer sandwiched between polyolefin layers, wherein the block copolymer layer comprises a selectively hydrogenated high vinyl block copolymer in admixture with one or more polyolefins as defined hereinbefore. In those embodiments wherein the block copolymer layer comprises a selectively hydrogenated high vinyl block copolymer and one or more polyolefins, the weight ratio of block copolymer to polyolefin in the block copolymer layer will typically range from about 30:70 to about 90:10, preferably from about 40:60 to about 70:30, even more preferably from about 40:60 to about 60:40. In the most preferred embodiments where the block copolymer layer comprises a selectively hydrogenated high vinyl block copolymer and one or more polyolefins, the preferred polyolefins are polypropylenes or polyethylenes with polypropylenes being the most preferred. In such film layers, the at least one block copolymer, as defined hereinbefore, is simply dry blended with the one or more polyolefins and then the layer is formed in the same manner as the other layers of the film (without the necessity of additional measures to combine the two polymers). Note that from this blend a compatible homogeneous film layer results from extrusion The block copolymer layer of the flexible packaging films of the present invention may be modified further with the addition of polymers other than the previously described polyolefins, fillers, reinforcements, antioxidants, stabilizers, fire retardants, anti blocking agents, anti-foggers, pigments, slip agents, nucleating agents, nanocomposites, functionalizing agent, suntan screens, lubricants and other rubber and plastic compounding ingredients in one or more of the layers without departing from the scope of this invention. Such components are disclosed in various patents including, for example, U.S. Pat. Nos. 3,239,478 and 5,777,043, the disclosures of which are incorporated by reference. When one or more of such other components are present in the films of the present invention, they will be present in a total amount from about 0.05 weight percent to about 2.0 weight percent based on the total weight percent of the combined components in the block copolymer layer of the film.

As previously noted, the flexible packaging laminate films of the present invention have at least two layers of a polyolefin film bonded together by at least one layer of a block copolymer film. The multilayer laminates of the present invention can have any number of layers (e.g., from 3 to 15). One preferred laminate film comprises a three-ply laminate of two polyolefin film layers sandwiching a layer of a block copolymer, is provided. That is, the present invention contemplates laminates of the C-D-C or C-D-E type, where each C is the same polyolefin, E is a polyolefin that differs from C and D refers to one of the above-mentioned block copolymers. The multilayer laminates may be provided by any of the methods known in the art such as casting the layers or, alternatively, by blowing said film through a multilayer-annular orifice die.

In addition to three-ply laminates, the present invention also contemplates other multilayered laminates containing any number of layers (e.g., laminates having from 3 to 15 layers). Such laminate films include, but are not limited to, laminates represented by the type C-D-C, C-D-E, C-D-C-D-C, C-D-C-D-C-D-C, C-D-C-D-C-D-C-D-C, C-D-C-D-C-D-C-D-C-D-C, C-D-C-D-C-D-C, C-D-C-D-C-D-C-D-C-D-C-D-C, C-D-E-D-C, C-D-E-D-C-D-E-D-C, C-D-E-D-C-D-E-D-C-D-E-D-C, C-D-D-C, C-D-D-E, C-C-D-C-C, and C-E-D-E-C, wherein C, D and E are as defined hereinbefore. Said films may be prepared by casting the layers or alternatively by blowing said films through a multi-annular, orifice die using any of the processes known in the art for preparing laminate films.

With regard to the cast or blown film laminates of the present invention, these laminates have improved interlayer adhesion and improved toughness properties, e.g., improved instrumental impact strength, puncture resistant and improved dart impart strength, as well as improved optical properties. Of particular importance, these three-ply laminates provide excellent resistance to delamination. With regard to the laminated films, the block copolymer layer(s) typically constitute from about 10 to about 90% by weight of the laminate film, preferably from about 20 to about 60% by weight of the laminate film, and even more preferably from about 25 to about 50% by weight of the laminate film, based on the total weight of the laminate film. The polyolefin film layers typically constitute from about 90 to about 10% by weight of the laminate film, preferably from about 80 to about 40% by weight of the laminate film, and even more preferably from about 75 to about 50% by weight of the laminate film, based on the total weight of the laminated film. In one embodiment of three-ply laminates of the present invention, (those encompassing a pair of polyolefin film layers sandwiching a single layer of a block copolymer) the concentration of the block copolymer middle layer typically constitutes from about 10% and about 38% and the outer polyolefin film layers constitute between about 62% to about 90%, wherein said percentages are by weight, based on the total weight of the laminate film.

The films of the present invention can be made into articles that can be used in a variety of manners. Such articles include, but are not limited to, medical packaging (sterile and non-sterile) such as blood bags, IV bags, packages for holding medical equipment/tools/instruments; food wrap and packaging such as bags for holding foodstuffs (sealed and non-sealed) and wraps for containing foods such as used in the food industry and in individual homes; packaging or wraps for typical industrial and houseware applications; and barrier sheets such as one of the layers in a bed coverings, for covering soil beds, skin barrier sheets for stomas, draining wound and other areas subject to irritation.

While not a laminated film, it is also possible to make flexible packaging films from a blend of the polyolefin(s) and block copolymer(s) disclosed herein. In such films at least one block copolymer, as defined hereinbefore, could be blended, using techniques well known in the art, with at least one polyolefin to provide a film. For instance, one or more block copolymers may be physically blended with polypropylene, polyethylene or mixtures of polypropylene and polyethylene. The block copolymer and polyolefin can be simply dry blended without the necessity of any extraordinary measures to combine the two polymers thereby forming a compatible homogeneous film after extrusion In such films the concentrations of the polyolefin(s) and the block copolymer(s) are such that the polyolefin(s) comprise from about 50% to about 90% and the block copolymer comprises from about 50% to about 10%, said percentages being by weight, based on the total dry blend weight of the polymers. The blend of polyolefin(s) and block copolymer(s) could be processed into a flexible packaging film. More specifically, the film can be prepared as a blown film insofar as blown films provide biaxial orientation. Alternatively, the film may be formed into a cast film by extrusion. With regard to the blown films, it has been advantageously discovered that the blend produces films of reduced gauge insofar as the combination provides higher blowup ratios than could be provided by the polyolefin film itself. This is believed due to the enhanced melt strength provided by the block copolymer. The ability to provide high blowup ratios results, as those skilled in the art are aware, in thinner gauge films, which is highly desirable in the flexible packaging film industry. Thinner gauge films provide the same functionality as thicker gauge films but at significantly reduced material cost. In addition, thin gauge films produced by the blown film method have superior optical qualities, e.g., optical. Such optical qualities are also seen in cast films. Improved toughness, as manifested by dart impact and puncture resistance, is also a characteristic of the films formed of a mono polyolefin-block copolymer blend.

The following examples are given to illustrate the present invention. These examples are given for illustrative purposes only, and should not be construed as limiting the present invention.

EXAMPLES

The following components are used in the Examples that follow:

BCP1 (Block Copolymer 1) is a coupled S-E/B-S block copolymer having a vinyl content greater than 60%, a melt flow index of about 18 and a polystyrene content of about 20%, commercially available from KRATON Polymers LLC as KRATON® MD6932.

BCP2 (Block Copolymer 2) is a coupled S-E/B-S block copolymer having a vinyl content greater than 60%, a melt flow index of about 4 and a polystyrene content of about 13%, commercially available from KRATON Polymers LLC as KRATON® MD6945.

LDPE 1 (Marflex® 5355) is a low density polyethylene that is commercially available from Chevron Phillips having a MFI=2 g/10 min @ 190° C./2.16 kg, and a density=0.927 g/cm$^3$ LDPE 2 (LDPE 1010®) is a low density polyethylene polymer supplied by Huntsman Polymers.

LDPE 3 (PE 5050®) is a low density polyethylene polymer supplied by Huntsman Polymers.

LLDPE 1 (Marflex R-7109M) is a linear, low density polyethylene that is commercially available from Chevron Phillips having a MFI=0.9 g/10 min @ 190° C./2.16 kg and a density=0.918 g/cm$^3$ LLDPE 2 (LLDPE 8101®)) is a linear, low density polyethylene polymer supplied by Huntsman Polymers.

PP 1 (Sunoco FT021N) is a homopolymer polypropylene (PP) commercially available from Sunoco having a MFI=2.6 g/10 min @ 230° C./2.16 kg.

PP 2 (12N25A®) is a polypropylene polymer supplied by Huntsman Polymers.

PP3 12G25A® is a polypropylene polymer supplied by Huntsman Polymers.

PS (EA3300) is a polystyrene commercially available from Chevron Phillips having a MFI=1.8 g/10 min @ 200° C./5 kg D1403 (KRATON® D1403) is an SBS block copolymer commercially available from KRATON Polymers LLC having a MFI=11 g/10 min @ 200° C./5 kg 3G55 is an SBS block copolymer commercially available from BASF having a MFI=14.5 g/10 min @ 200° C./5 kg The amounts below are in weight percentages unless otherwise specified. The test methods used in the Examples are American Society for Testing Materials (ASTM) test methods, unless otherwise specified. The specific methods are set forth in Table 1:

TABLE 1

| ASTM Test Methods | |
|---|---|
| TEST | ASTM No. |
| Light Transmittance | D-1003 |
| Haze | D-1003 |
| Gloss In | D-2457 |
| Gloss Out | D-2457 |
| Coefficient of Friction (COF) In/Out | D-1894 |
| Eval. Gauge | Manual measurement-via caliper |
| Tensile Properties for Tables 4 and 7 | D-882 |
| Tensile Properties for Table 8 | D-638 |
| Elmendorf Tear | D-1922 |

TABLE 1-continued

ASTM Test Methods

| TEST | ASTM No. |
|---|---|
| Dart Impact | D-1709 |
| T Peel Test | D-1876-61T |
| Instrumented Impact | D-3763 |

For the examples noted below, a series of three-layered films were prepared in which various polyolefins, including low density polyethylene (LDPE), linear low density polyethylene (LLDPE) and polypropylene (PP), were used with the block copolymers of the present invention to produce packaging films. More specifically, BCP1 and BCP2, within the present invention, were utilized in preparing the laminates, which were thereafter tested to determine their feasibility for use as packaging films.

In Examples 1 to 6, the laminates were prepared by casting and co-extruding each of the layers of the films utilizing a Killion coextrusion machine under the following parameters Killion Multilayer Film Line

| | Film Skin Layers | | |
|---|---|---|---|
| | LDPE 1 | LLDPE 1 | PP 1 |
| Extruder Temperature Range | 188-204° C. | 188-204° C. | 199-216° C. |
| Die Temperature | 200° C. | 200° C. | 210-217° C. |
| Chill Roll Temperature | 17° C. | 17° C. | 17° C. |

Once the films were extruded, they were placed at a constant temperature and humidity (23° C., 50% humidity) for at least 48 hours before testing.

The actual films made included outer layers of the noted polyolefin and an inner layer of the block copolymer of the present invention (BCP1 or BCP2) or a polymer of the prior art (e.g., PS, D1403, or 3G55). For example, films of the structure C-D-C were made wherein C is a polyolefin layer and D is a styrenic block copolymer layer either of the present invention or of the prior art. Also included for comparative purposes were control laminated films that consisted of polyolefin layers only (i.e., three layers of LDPE, LLDPE or PP). The controls were made in the same manner as the other films with the exception that each layer comprised the same material. For example, films of the structure C-C-C were made wherein each C is a polyolefin layer. In addition, films having different gauges were also tested.

Note that the haze properties were measured on BYK Garner Haze-gard Plus. Impact properties were measured using Dynatup Impact Tester. Film Impact Method: 6,959 lb hammer wt. 500 lb Piezo tup. 22.75" gravity drop. The impact speed was at 3600 in/min.

Example 1

A series of films were prepared in the manner noted above. These films were then subjected to T Peel test to determine the degree of adhesion between the layers. The results are in Table 2 below.

TABLE 2

Adhesion Between LDPE, LLDPE, and Homo-PP Skin Using SBC Mid-layers as the Tying Layer (films of a 4 mil gauge with the mid layer comprising 2 mil)

| Example # | Structure Layer C/Layer D/Layer C | T Peel (pli) |
|---|---|---|
| C. Ex. 1 | LDPE 1/PS/LDPE 1 | 0.07 |
| C. Ex. 2 | LDPE1/D1403/LDPE 1 | 0.25 |
| C. Ex. 3 | LDPE1/3G55/LDPE 1 | 0.15 |
| Ex. 1 | LDPE 1/BCP1/LDPE 1 | No delamination, LDPE stretched |
| Ex. 2 | LDPE 1/BCP 2/LDPE 1 | No delamination, LDPE stretched |
| C. Ex. 4 | LLDPE 1/PS/LLDPE 1 | 0.21 |
| C. Ex. 5 | LLDPE 1/D1403/LLDPE 1 | 1.67 |
| C. Ex. 6 | LLDPE 1/3G55/LLDPE 1 | 1.41 |
| Ex. 3 | LLDPE 1/BCP1/LLDPE 1 | No delamination, LLDPE stretched |
| C. Ex. 7 | PP 1/PS/PP 1 | 0 |
| C. Ex. 8 | PP 1/D1403/PP 1 | 0.14 |
| Ex. 4 | PP 1/BCP1/PP 1 | No delamination, PP stretched |
| Ex. 5 | PP 1/BCP 2/PP 1 | No delamination, PP stretched |

With regard to the data in Table 2 above, it can be seen that when polystyrene (PS) was used as the tie layer for two layers of LDPE (C. Ex. 1), adhesion was poor. The same was found when PS was used as the tie layer for LLDPE (C. Ex. 4) and Homo PP (C. Ex. 7). While different levels of interlayer adhesion were observed for the styrenic block copolymers with regard to different polyolefins, in all cases BCP1 and BCP2 had significantly higher interlayer adhesion than the other styrenic block copolymers to the point that measurement of peel force was not even possible.

Example 2

Additional three layer laminated films of the present invention were made and compared to laminated films made with different polymers as the tie layer. The films were then subjected to haze and impact tests as defined hereinbefore. The results are listed in Table 3 below.

TABLE 3

Haze and Impact Properties of 3 Layer Coextruded Films Having LDPE Outer Layers

| Example | Structure | Gauge mil | Haze, % | Instrumented impact, total energy, in-lb |
|---|---|---|---|---|
| C. Ex. 1 | LDPE 1/LDPE 1/LDPE 1 | 1/2/1 | 6.2 | 3.0 |
| C. Ex. 2 | LDPE 1/PS/LDPE 1 | 1/2/1 | 4.5 | 0.4 |
| C. Ex. 3 | LDPE 1/D1403/LDPE 1 | 1/2/1 | 3.6 | 6.5 |
| C. Ex. 4 | LDPE 1/3G55/LDPE 1 | 1/2/1 | 3.6 | 5.3 |
| Ex. 1 | LDPE 1/BCP1/LDPE 1 | 1/2/1 | 4.0 | No breaking |
| Ex. 2 | LDPE 1/BCP 2/LDPE 1 | 1/2/1 | 3.9 | No breaking |
| C. Ex. 5 | LDPE 1/D1403/LDPE 1 | 1/1/1 | 4.3 | 3.0 |
| Ex. 3 | LDPE 1/BCP1/LDPE 1 | 1/1/1 | 4.3 | No breaking |

With regard to the data in Table 3, haze was reduced when styrenic block copolymers were used as tie layers for LDPE compared to films in which the LDPE layers were tied using PS or another layer of LDPE. While haze was found to be comparable among the films of styrenic block copolymers, impact was significantly better for those 1/2/1 films with BCP 1 and BCP 2 as the tie layer.

Example 3

Additional three layer laminated films of the present invention were made and compared to laminated films made with different polymers as the tie layer. The films were then subjected to tensile strength, tensile elongation and tearing force tests as defined hereinbefore. The results are in Table 4 below.

TABLE 4

Tensile and Tear Properties of Three Layer Coextruded Films Having LDPE Outer Layers

|  | Structure | Gauge, mil | Tensile Strength psi | Tensile Elongation % | Tearing Force Gf |
|---|---|---|---|---|---|
| C. Ex. 1 | LDPE 1/LDPE 1/LDPE 1, MD | 1/2/1 | 3216 | 575 | 509 |
| C. Ex. 1 | LDPE 1/LDPE 1/LDPE 1, TD | 1/2/1 | 2348 | 781 | 918 |
| C. Ex. 2 | LDPE 1/PS/LDPE 1, MD | 1/2/1 | 5599 | 5 | 92 |
| C. Ex. 2 | LDPE 1/PS/LDPE 1, TD | 1/2/1 | 1794 | 2 | 132 |
| C. Ex. 3 | LDPE 1/D1403/LDPE 1, MD | 1/2/1 | 4195 | 443 | 79 |
| C. Ex. 3 | LDPE 1/D1403/LDPE 1, TD | 1/2/1 | 3322 | 460 | 159 |
| C. Ex. 4 | LDPE 1/3G55/LDPE 1, MD | 1/2/1 | 4268 | 532 | 145 |
| C. Ex. 4 | LDPE 1/3G55/LDPE 1, TD | 1/2/1 | 3397 | 571 | 452 |
| Ex. 1 | LDPE 1/BCP1/LDPE 1, MD | 1/2/1 | 1996 | 634 | 164 |
| Ex. 1 | LDPE 1/BCP1/LDPE 1, TD | 1/2/1 | 2202 | 973 | 538 |
| Ex. 2 | LDPE 1/BCP2/LDPE 1, MD | 1/2/1 | 1343 | 422 | 144 |
| Ex. 2 | LDPE 1/BCP2/LDPE 1, TD | 1/2/1 | 1430 | 894 | 570 |
| C. Ex. 5 | LDPE 1/D1403/LDPE 1, MD | 1/1/1 | 4205 | 461 | 40 |
| C. Ex. 5 | LDPE 1/D1403/LDPE 1, TD | 1/1/1 | 2764 | 520 | 310 |
| Ex. 3 | LDPE 1/BCP1/LDPE 1, MD | 1/1/1 | 2834 | 523 | 150 |
| Ex. 3 | LDPE 1/BCP1/LDPE 1, TD | 1/1/1 | 2415 | 891 | 498 |

When BCP1 and BCP2 were used as the tie layer (midlayer) for LDPE, higher tensile elongation (TD) was observed compared to the LDPE multilayer control. In addition, higher tensile elongation (in both directions) was observed compared to when PS was used as the tie layer.

Example 4

Additional three layer laminated films of the present invention were made and compared to laminated films made with different polymers as the tie layer. The films were then subjected to haze and impact tests as defined hereinbefore. The results are in Table 5 below.

TABLE 5

Haze and Impact Properties of Three Layer Coextruded Films Having LDPE Outer Layers

|  | Structure | Gauge Mil | Haze, % | Instrumented impact, total energy, |
|---|---|---|---|---|
| C. Ex. 1 | LLDPE 1/LLDPE 1/LLDPE 1 | 1/2/1 | 14.2 | 2.9 |
| C. Ex. 2 | LLDPE 1/PS/LLDPE 1 | 1/2/1 | 24.4 | 1.0 |
| C. Ex. 3 | LLDPE 1/D1403/LLDPE1 | 1/2/1 | 8.5 | 5.4 |
| C. Ex. 4 | LLDPE 1/3G55/LLDPE1 | 1/2/1 | 8.9 | 4.8 |
| Ex. 1 | LLDPE 1/BCP1/LLDPE1 | 1/2/1 | 9.4 | No breaking |
| C. Ex. 5 | LLDPE 1/D1403/LLDPE1 | 1/1/1 | 10.4 | 3.3 |
| C. Ex. 6 | LLDPE 1/3G55/LLDPE1 | 1/1/1 | 9.1 | 3.0 |
| Ex. 2 | LLDPE1/BCP1/LLDPE1 | 1/1/1 | 8.9 | No breaking |

With regard to the data in Table 5, haze was reduced and impact increased when styrenic block copolymers were used as the tie layers for LLDPE compared to films in which the LLDPE layer were tied using PS or another LLDPE layer. As can be seen from this data, the haze properties for BCP1 were found to be comparable to those of D1403 and 3G55 while the impact properties for BCP 1 were significantly higher than for the other styrenic block copolymers. Accordingly, Applicants have achieved a laminated film in which adhesion is tremendously increased without adversely affecting haze and impact.

Example 5

Additional three layer laminated films of the present invention were made and compared to laminated films made with different polymers as the tie layer. The films were then subjected to haze and impact tests as defined hereinbefore. The results are in Table 6 below.

TABLE 6

Three Layer Coextruded Films Using Polypropylene Homopolymer as the Outer Layers

|  | Structure | Gauge, mil | Haze, % | Instrumented impact, total energy, in-lb |
|---|---|---|---|---|
| C. Ex. 1 | PP 1/PP 1/PP 1 | 1/2/1 | 7.6 | 0.9 |
| C. Ex. 2 | PP 1/PS/PP1 | 1/2/1 | 6.8 | 0.4 |
| C. Ex. 3 | PP 1/D1403/PP1 | 1/2/1 | 6.9 | 1.7 |
| Ex. 1 | PP 1/BCP1/PP1 | 1/2/1 | 5.1 | 3.2 |
| Ex. 2 | PP 1/BCP 2/PP 1 | 1/2/1 | 6.3 | 2.3 |
| Ex. 3 | PP1/BCP2 50% + PP1 50%/PP1 | 1/2/1 | 6.7 | 4.0 |

With regard to the data in Table 6, haze was reduced and impact increased when BCP 1 and BCP 2 were used as tie layers for PP compared to films in which the layers were all PP or the tie layer was PS. Impact was significantly increased when the BCP layer comprised a 50:50 mixture of BCP 2 and PP 1. As can be seen from this data, the haze and impact properties for BCP 1 and BCP 2 were found to be better compared to those of D1403.

Example 6

Additional three layer laminated films of the present invention were made and compared to laminated films made with different polymers as the tie layer. The films were then subjected to tensile strength, tensile elongation and tearing force tests. The results are in Table 7 below. Films were tested using ASTM D882 Sheet Tensile method.

TABLE 7

Tensile and Tear Properties of Three Layer Coextruded Films Having LDPE Outer Layers

|  | Structure | Gauge, mil | Tensile Strength Psi | Tensile Elongation % | Tearing force, gf |
|---|---|---|---|---|---|
| C. Ex. 1 | PP1/PP 1/PP 1, MD | 1/2/1 | 6330 | 783 | 48 |
| C. Ex. 1 | PP1/PP 1/PP 1, TD | 1/2/1 | 4420 | 7 | 141 |
| C. Ex. 2 | PP 1/PS/PP1, MD | 1/2/1 | 6224 | 4 | 32 |
| C. Ex. 2 | PP 1/PS/PP1, TD | 1/2/1 | 2699 | 2 | 99 |
| C. Ex. 3 | PP 1/D1403/PP1, MD | 1/2/1 | 3858 | 455 | 95 |
| C. Ex. 3 | PP 1/D1403/PP1, TD | 1/2/1 | 2927 | 167 | 273 |
| Ex. 1 | PP 1/BCP1/PP1, MD | 1/2/1 | 3568 | 619 | 123 |
| Ex. 1 | PP 1/BCP1/PP1, TD | 1/2/1 | 3159 | 839 | 813 |
| Ex. 2 | PP 1/BCP2/PP1, MD | 1/2/1 | 2716 | 629 | 115 |
| Ex. 2 | PP 1/BCP2/PP1, TD | 1/2/1 | 2330 | 805 | 750 |
| Ex. 3 | PP 1/50% BCP2 + 50% PP1/PP1, MD | 1/2/1 | 4821 | 738 | 167 |
| Ex. 3 | PP 1/50% BCP2 + 50% PP1/PP1, TD | 1/2/1 | 4119 | 963 | 1534 |

Using styrenic block copolymers as tie layers results in significantly higher tensile elongation in TD than the two control films, with the tensile elongation of BCP1, BCP2, and a 50:50 mixture of BCP 2 and PP 1 being the better of the styrenic block copolymers. Using styrenic block copolymers as tie layers results in significantly higher tearing resistance performance in both TD and MD than the two control films, with BCP1, BCP 2 and a 50:50 mixture of BCP 2 and PP 1 again being the better performers of the styrenic block copolymers.

Example 7

A series of three layer laminated films of the present invention were made and compared to laminated films made with different polymers as the tie layer. The laminates were prepared by casting and coextruding each of the layers. The laminates included outer layers of polyolefin and inner layers of block copolymers. The films were then subjected to tensile strength, tensile elongation and tearing force tests. The results are in Table 8 below. Films were tested using ASTM D638 Tensile method.

Table 8 below includes the various formulations that were used, the processing conditions used in formulating the same, and various physical test results for each of the formulations prepared. The designation A1, A2, A3, etc is used herein to denote repeated testing using the same formulations. The numbers in parentheses show standard deviations for multiple runs.

Table 8 below includes various physical test results for each of the samples prepared.

TABLE 8

|  | Structure | Light Transmittance | Haze | COF, Static (In) | COF, kinetic (Out) |
|---|---|---|---|---|---|
| Ex. 1 | PP2/BCP1/PP2 | 94.6 (0) | 2.83 (0.10) | 1.23 | 1.23 |
| Ex. 2 | PP2/BCP1/LDPE 3 | 94.4 (0) | 7.26 (0.08) | 0.55 | 0.3 |
| Ex. 3 | PP3/BCP1/PP3 | 94.4 (0.07) | 2.95 (0.05) | 2.23 | 2.23 |
| Ex. 4 | PP3/BCP1/LDPE 3 | 94.05 (0.21) | 7.62 (0.66) | 2.23 | 0.33 |

| MD | Structure | Eval. Gauge Gauge, mil total ($M_D$) | Tensile @ Brk, psi | Elongation @ Brk, % | Tensile Modulus, psi | Elmendorf Tear, g |
|---|---|---|---|---|---|---|
| Ex. 1 | PP2/BCP1/PP2 | 2 | 1,550 | 801 | 20,305 | 160 |
| Ex. 2 | PP2/BCP1/PE | 2 | 1,170 | 659 | 17,299 | 202 |

-continued

| MD | Structure | Eval. Gauge Gauge, mil total ($M_D$) | Tensile @ Brk, psi | Elongation @ Brk, % | Tensile Modulus, psi | Elmendorf Tear, g |
|---|---|---|---|---|---|---|
| Ex. 3 | PP3/BCP1/PP3 | 2 | 1,550 | 821 | 25,014 | 182 |
| Ex. 4 | PP3/BCP1/LDPE3 | 4 | 610 | 752 | 10,109 | 368 |

| TD | Structure | Eval. Gauge Gauge, mil total ($M_P$) | Tensile @ Brk, psi | Elongation @ Brk, % | Tensile Modulus, psi | Elmendorf Tear, g | Dart, g |
|---|---|---|---|---|---|---|---|
| Ex. 1 | PP2/BCP1/PP2 | 2 | 1,390 | 747 | 20,269 | 202 | 149 |
| Ex. 2 | PP2/BCP1/PE | 2 | 1,030 | 736 | 10,822 | 506 | 365 |
| Ex. 3 | PP3/BCP1/PP3 | 2 | 1,550 | 673 | 19,059 | 266 | 165 |
| Ex. 4 | PP3/BCP1/LDPE3 | 3 | 680 | 847 | 11,485 | 1,021 | 270 |

In general, Examples 1, 2, 3 and 4, given the gauge, the PE or PP or PP/PE combination used, and at different concentrations of block copolymer in the core, have superior dart and tear properties. All samples have superior elongation and optical properties. Furthermore, the adhesion to both types of polyolefins was strong, and the results were superior.

The data provided above indicate the expected physical/mechanical properties that can be achieved by combining a block copolymer layer such as BCP1 with polyolefin layers in laminated films. In the past, this has not been possible unless a material with a functionality (a tie layer), or a special blend of multiple components was utilized to compensate for the lack of affinity that polyolefins have with respect to styrene-containing products.

Again, the key to the inventive laminates is the specific styrenic block copolymers that demonstrate a strong affinity to polyolefins, and are capable of being processed in a conventional extrusion line, also with down-gauging potential.

The above embodiments and examples are given to illustrate the scope and spirit of the present invention. These embodiments and examples will make apparent, to those skilled in the art, other embodiments and examples. Those other embodiments and examples are within the contemplation of the present invention. Therefore, the present invention should be limited only by appended claims.

What is claimed is:

1. A flexible packaging laminate film comprising at least two polyolefin layers and at least one block copolymer layer, wherein said block copolymer comprises a selectively hydrogenated high vinyl block copolymer having at least one $A_1$ block and at least one $B_1$ block and having the general formula:

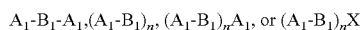

or mixtures thereof, wherein
(1) each $A_1$, prior to hydrogenation, is predominantly a polymerized monoalkenyl arene hydrocarbon block having a molecular weight of from 4,000 to 45,000;
(2) each $B_1$, prior to hydrogenation, is predominantly a polymerized conjugated diene hydrocarbon block selected from the group consisting of polybutadiene, polyisoprene, polypentadiene, polyhexadiene and mixtures thereof, having a molecular weight of from 20,000 to 300,000 when the block copolymer is sequential and from 10,000 to 150,000 when the block copolymer is coupled;
(4) n has a value of 2 to 30 and X is a coupling agent residue;
(5) the monoalkenyl arene content of the block copolymer is from 8 to 40 weight percent;
(6) the vinyl content of the conjugated diene hydrocarbon block prior to hydrogenation is from 60 to 85 mol percent;
(7) subsequent to hydrogenation less than 50 percent of the monoalkenyl aromatic double bonds have been hydrogenated and at least 80 percent of the conjugated diene double bonds have been hydrogenated; and
(8) the melt index of the block copolymer is from 1 to 40 grams/10 minutes according to ASTM D1238 at 230° C. and 2,16 kg weight.

2. The flexible packaging laminate film of claim 1 wherein said laminate comprises from 3 to 15 layers.

3. The flexible packaging laminate film of claim 2 wherein A1 is styrene, B1 is butadiene, and each polyolefin layer independently comprises polyolefins selected from low density polyethylene (LDPE), high density polyethylene (HDPE), linear low density polyethylene (LLDPE), ultra low density polyethylene (ULDPE), very low density polyethylene (VLDPE), medium density polyethylene (MDPE), polypropylene (PP), copolymers of ethylene and vinyl alcohol, or a copolymer of ethylene and vinyl acetate.

4. The flexible packaging laminate film of claim 3 wherein each $A_1$, prior to hydrogenation, has a molecular weight of from 5,000 to 15,000; each $B_1$, prior to hydrogenation, has a molecular weight of from 35,000 to 175,000 when the block copolymer is sequential and from 17,500 to 87,500 when the block copolymer is coupled.

5. The flexible packaging laminate film of claim 4 wherein the monoalkenyl arene content of the block copolymer is from 10 to 20 weight percent, and the melt index is from 1 gram/10 minutes to 25 grams/10 minutes.

6. The flexible packaging laminate film of claim 5 wherein said block copolymer layer comprises block copolymer and one or more polyolefins wherein the ratio of block copolymer to polyolefin in said block copolymer layer is from 30:70 to 90:10.

7. The flexible packaging laminate film of claim 6 wherein the ratio is from 40:60 to 60:40.

8. The flexible packaging laminate film of claim 5 wherein the melt flow index is from 3 grams/10 minutes to 10 grams/10 minutes.

9. The flexible packaging laminate film of claim 5 wherein the melt flow index is from 15 grams/10 minutes to 25 grams/10 minutes.

10. The flexible packaging laminate film of claim 5 wherein the block copolymer is a coupled block copolymer and n has a value of 2 to 6.

11. The flexible packaging laminate film of claim 5 wherein (1) the polyolefins are polypropylene and polyethylene; and (2) subsequent to hydrogenation from 0 to 30 percent of the monoalkenyl arene double bonds have been hydrogenated and at least 90 percent of the conjugated diene double bonds have been hydrogenated.

12. The flexible packaging laminate film of claim 3 wherein said polyolefin is present in a concentration from 50% to 90% and said styrenic block copolymer is present in a concentration from 10% to 50%, said percentages being by weight, based on the total weight of said packaging film.

13. The flexible packaging laminate film of claim 1 wherein said laminate film comprises one block copolymer layer and two polyolefin layers wherein said block copolymer layer is sandwiched between said two polyolefin layers.

14. The flexible packaging laminate film of claim 13 wherein A1 is styrene, B1 is butadiene and each polyolefin layer independently comprises polyolefins selected from low density polyethylene (LDPE), high density polyethylene (HDPE), linear low density polyethylene (LLDPE), ultra low density polyethylene (ULDPE), very low density polyethylene (VLDPE), medium density polyethylene (MDPE), polypropylene (PP), copolymers of ethylene and vinyl alcohol, or a copolymer of ethylene and vinyl acetate.

15. The flexible packaging laminate film of claim 14 wherein each A1, prior to hydrogenation, has a molecular weight of from 5,000 to 15,000; each B1, prior to hydrogenation, has a molecular weight of from 35,000 to 175,000 when the block copolymer is sequential and from 17,500 to 87,500 when the block copolymer is coupled.

16. The flexible packaging laminate film of claim 15 wherein the monoalkenyl arene content of the block copolymer is from 10 to 20 weight percent and the melt index is from 1 gram/10 minutes to 25 grams/10 minutes.

17. The flexible packaging laminate film of claim 16 wherein said block copolymer layer comprises block copolymer and one or more polyolefins wherein the ratio of block copolymer to polyolefin in said block copolymer layer is from 30:70 to 90:10.

18. The flexible packaging laminate film of claim 17 wherein the ratio is from 40:60 to 60:40.

19. The flexible packaging laminate film of claim 16 wherein the melt flow index is from 3 grams/10 minutes to 10 grams/10 minutes.

20. The flexible packaging laminate film of claim 16 wherein the melt flow index is from 15 grams/10 minutes to 25 grams/10 minutes.

21. The flexible packaging laminate film of claim 16 wherein the block copolymer is a coupled block copolymer and n has a value of 2 to 6.

22. The flexible packaging laminate film of claim 16 wherein (1) the polyolefins are polypropylene and polyethylene; and (2) subsequent to hydrogenation from 0 to 30 percent of the inonoalkenyl arene double bonds have been hydrogenated and at least 90 percent of the conjugated diene double bonds have been hydrogenated.

23. The flexible packaging laminate film of claim 16 wherein said polyolefin layers are the same polyolefin.

24. The flexible packaging laminate film of claim 16 wherein said polyolefin layers are different polyolefins.

25. The flexible packaging laminate film of claim 14 wherein said polyolefin is present in a concentration from 50% to 90% and said styrenic block copolymer is present in a concentration from 10% to 50%, said percentages being by weight, based on the total weight of said packaging film.

* * * * *